United States Patent

Bruyere et al.

[11] Patent Number: 6,113,849
[45] Date of Patent: Sep. 5, 2000

[54] NICKEL-BASED ALLOY AND WELDING ELECTRODE MADE OF NICKEL-BASED ALLOY

[75] Inventors: Albert Bruyere, Denis-les-Bourgs; Jean-Bernard Couffin; Ricardo Cozar, both of Varennes-Vauzelles; Jacques Levigoureux, Sauvigny-les-Bois, all of France

[73] Assignee: Ugine-Savoie Imphy S.A., Ugine, France

[21] Appl. No.: 09/114,252

[22] Filed: Jul. 13, 1998

[30] Foreign Application Priority Data

Jul. 18, 1997 [FR] France .................................. 97 09132

[51] Int. Cl.⁷ .................................................. C22C 19/05
[52] U.S. Cl. ............................ 420/442; 148/410; 148/427
[58] Field of Search ................................ 148/410, 427; 420/442

[56] References Cited

U.S. PATENT DOCUMENTS 3,918,964 11/1975 Baldwin et al. .
4,245,698 1/1981 Berkowitz et al. .
4,325,994 4/1982 Kitashima et al. .
4,533,414 8/1985 Asphahani ............................... 148/427
4,692,305 9/1987 Rangaswamy et al. ................. 420/436
5,529,642 6/1996 Sugahara et al. ....................... 148/427

FOREIGN PATENT DOCUMENTS

| 0 693 565 | 1/1996 | European Pat. Off. . |
| 195 36 978 | 4/1996 | Germany . |
| 53-113734 | 10/1978 | Japan . |
| 55-8326 | 1/1980 | Japan . |
| 4-99240 | 3/1992 | Japan . |
| 4-182080 | 6/1992 | Japan . |

*Primary Examiner*—John Sheehan
*Attorney, Agent, or Firm*—Oblon, Spivak, McClelland, Maier & Neustadt, P.C.

[57] ABSTRACT

Nickel-based alloy, the chemical composition of which comprises, by weight, from 24.5% to 26.5% chromium and from 13.5% to 16.5% molybdenum, the remainder being nickel, optionally one or more complementary alloy elements selected from iron, aluminium and magnesium, and impurities resulting from processing. Drawn wire made of nickel-based alloy, and welding electrode including a drawn wire made of nickel-based alloy.

11 Claims, No Drawings

NICKEL-BASED ALLOY AND WELDING ELECTRODE MADE OF NICKEL-BASED ALLOY

FIELD OF THE INVENTION

The present invention relates to a nickel-based alloy which is particularly suited to the manufacture of wires for welding superduplex or superaustenitic stainless steels having very good resistance to localized corrosion.

PRIOR ART

Superduplex or superaustenitic stainless steels are stainless steels which, in particular, contain from 18% to 30% chromium, up to 7% molybdenum and up to 0.5% nitrogen (in % by weight). These steels are characterized by a Pren coefficient=Cr+3.3×Mo+16×N in excess of 35. This coefficient is an indicator of the localized corrosion resistance of these steels, the resistance to localized corrosion being commensurately better as the Pren coefficient is high.

These steels are used, in particular, in the form of plates assembled by welding in order to manufacture a variety of equipment used in highly corrosive environments. This equipment is, for example, equipment for separating oil and gas in oil extraction plants, and equipment for petrochemistry, chemistry or pollution abatement.

In order for the equipment manufactured in this way to have a satisfactory service life, the welds need to have sufficient corrosion resistance. To carry out the welding, use is then made of electrodes made of nickel-based alloy such as the "625" alloy which contains about 21% chromium and 9% molybdenum, the remainder being nickel, impurities, and optionally small quantities of secondary alloy elements. However, this technique does not make it possible to obtain welds having corrosion resistance as good as that of the plates.

In order to improve the corrosion resistance of the welds, use is sometimes made of welding electrodes consisting of wires made of nickel-based alloy containing principally from 19% to 24% chromium and from 12% to 17% molybdenum, the remainder being nickel, small quantities of secondary alloy elements and impurities resulting from processing. However, this technique does not make it possible to increase the corrosion resistance and durability of the welds sufficiently.

It is therefore desirable to provide welding electrodes made of nickel-based alloy which make it possible to obtain even better corrosion resistance and durability in the welds. This alloy must, however, also be capable of being rolled easily in the form of a wire. In particular, this presupposes that it has sufficient hot ductility.

SUMMARY OF THE INVENTION

The object of the present invention is to provide an alloy of this type, which can be used in the form of a wire for a welding electrode or a welding filler metal wire.

To this end, the invention relates to a nickel-based alloy whose chemical composition, in % by weight, is such that:

24.5%<Cr≦26.5%

13.5%≦Mo≦16.5% the remainder being nickel, possible complementary alloy elements and impurities resulting from processing (the complementary alloy elements may be nitrogen up to 0.2%, aluminium up to 0.4% and magnesium up to 0.04%).

Preferably, the chromium content is between 24.8% and 25.2% and the molybdenum content is between 14.8% and 15.2%.

The impurities may, in particular, be iron, carbon, silicon, manganese, tungsten, copper, phosphorous and sulfur. The iron content should preferably remain below 5%, or even better below 2%. The maximum levels of the other impurities should preferably remain below the following values:

C≦0.02%

Si≦0.1%

Mn≦0.4%

W≦0.3%

Cu≦2%

P≦0.02%

S≦0.02%

This alloy may be used in the form of a plate, a forging, a tube, a wire or a sheet. In particular, when it is in the form of a drawn wire having a diameter generally between 0.6 mm and 5 mm, it may constitute either a MIG welding electrode or a filler metal wire for TIG welding or even the metal core of a nonsynthetic clad electrode. When it is in the form of a cold-rolled sheet, it may also be used as filler metal for the production of coatings by welding.

The invention also relates to a process for TIG or MIG welding superaustenitic or superduplex stainless steel products.

DESCRIPTION OF THE PREFERRED EMBODIMENTS

The invention will now be described in more detail, but without implying any limitation, and illustrated by examples.

Further to the nickel on which it is based, the alloy according to the invention contains:

more than 24.5%, and preferably more than 24.8%, but less than 26.5%, and preferably less than 25.2%, chromium;

from 13.5% to 16.5%, and preferably from 14.8% to 15.2% molybdenum.

The levels of these two elements are chosen to make it possible to obtain a Pren in excess of 69, and of about 75 for preferential analysis, while avoiding excessive formation of intermetallic phases such as the σ phase during solidification.

A Pren which is high enough makes it possible to obtain good corrosion resistance.

The limited formation of intermetallic phases makes it possible to carry out hot welding under good conditions and allows the weld to have good ductility properties. In particular, the intermetallic phases may be put in solution by heating to above 1200° C. for a few hours, this being essential for manufacturing machine wire under good conditions, or more generally for carrying out shaping by hot plastic deformation, for example rolling or forging.

The alloy may furthermore contain:

from 0% to 0.2% nitrogen in order to limit the formation of intermetallic phases in the weld beads, and thus to ensure that these welds have good corrosion resistance and good durability; it should be noted that, without specific treatment during processing, the alloy still contains between about 0.01% and 0.05% nitrogen, but for certain applications it is desirable to fix the nitrogen content with greater precision, and in particular to add a quantity of it so that the content is more than 0.05%;

from 0% to 0.04% aluminium in order to ensure that the weld beads have good compactness;

from 0% to 0.04% magnesium to improve the capacity for hot rolling and also the compactness of the weld beads;
the remainder consists of impurities resulting from processing. The levels of these impurities should be limited, and in particular:

the iron content should preferably remain less than 5%, and even better less than 2%, this being in particular the case when the alloy is intended for producing a coating by welding on a low-alloy steel article, in order to limit dilution by the iron in the coating layer in contact with the corrosive medium;

the carbon content should preferably remain less than 0.02% in order to avoid risks of inter-granular corrosion in thermally upgraded weld beads, in particular in the case of multipass welding;

the silicon and manganese contents should preferably remain respectively below 0.1% and 0.4% in order to reduce the tendency to form the σ phase;

the tungsten content should preferably remain less than 0.3% in order to limit the formation of intermetallic phases;

the copper content should preferably remain less than 2% in order to ensure good capacity for hot plastic deformation during the manufacture of machine wire;

the phosphorous content should preferably remain less than 0.02% in order to ensure that the welds have good resistance to hot cracking;

the sulfur content should preferably remain less than 0.02% in order to ensure that the welds have good resistance to hot cracking and good corrosion stability.

The alloy having this composition is cast, for example, in the form of a billet, then after reheating to above 1200° C. for more than 4 hours, it is hot rolled on a wire mill to obtain a machine wire with a diameter of between 5.5 mm and 10 mm. This machine wire is then drawn to a diameter of between 0.6 mm and 5 mm.

The drawn wire obtained in this way can be used directly for TIG or MIG welding articles, for example plates, made of superduplex or superaustenitic stainless steel. It may also be used for welding articles made of nickel-based alloy such as, for example, an alloy of the "625" type.

By way of example and comparison, an alloy A according to the invention and alloys B and C according to the prior art were manufactured, their chemical compositions being (in % by weight):

|   | Cr | Mo | N | Al | Mg | Fe | C | Si | Mn | W | Cu | P | S | Pren |
|---|---|---|---|---|---|---|---|---|---|---|---|---|---|---|
| A | 24.8 | 15.0 | 0.12 | 0.12 | 0.012 | 1.8 | 0.01 | 0.06 | 0.06 | 0.05 | 0.01 | 0.004 | 0.001 | 76.2 |
| B | 22.5 | 15.9 | 0.02 | 0.25 | 0.003 | 0.23 | 0.01 | 0.02 | 0.15 | 0.03 | 0.01 | 0.002 | 0.002 | 75.3 |
| C | 21.4 | 12.8 | 0.02 | 0.10 | 0.008 | 3.2 | 0.01 | 0.05 | 0.22 | 2.9 | 0.04 | 0.008 | 0.001 | 64.0 |

With these alloys, 5.5 mm diameter machine wire was manufactured by hot rolling after reheating to 1200° C. for 8 hours, and this was drawn to obtain 1.2 mm diameter drawn wire.

These three wires were used to MIG weld 8 mm thick superduplex stainless steel plates having the following composition:

| Cr | Ni | Mo | N | C | Si | Mn | S | P | Pren |
|---|---|---|---|---|---|---|---|---|---|
| 25.0 | 6.3 | 3.7 | 0.25 | 0.015 | 0.34 | 1.0 | 0.001 | 0.012 | 41.2 |

V-joints (angle=70°) were produced, the shield gas being argon with 20% helium and the welding energy was 0.7 kJ/mm. All the welds had a satisfactory appearance and their properties were:

| Wire | Compactness (ASME IX) | Max. Ferrite in ZAT (%) | Average melt zone Pren | Tc scratch C. ASTM G 48 A | KCV - 50° C. (J/cm$^2$) | Rm (MPa) |
|---|---|---|---|---|---|---|
| A | Acceptable | 60 | 69.3 | 55 | 184 | 864 |
| B | Acceptable | 66 | 68.4 | 50 | 126 | 848 |
| C | 1 fusion failure | 72 | 59.2 | 47.5 | 98 | 812 |

These results show that wire A according to the invention gives better corrosion resistance and, above all, better low-temperature resilience than wires B and C according to the prior art. This superior performance is, in particular, beneficial when the welds are made on equipment intended for offshore oil extraction.

| Cr | Ni | Mo | W | Mn | N | Cu | C | Si | S | P | Pren |
|---|---|---|---|---|---|---|---|---|---|---|---|
| 23.7 | 21.6 | 5.7 | 2.0 | 3.0 | 0.48 | 1.6 | 0.02 | 0.10 | 0.0005 | 0.016 | 50.2 |

Wires A and C were also used to weld 15 mm thick superaustenitic steel plates with the following composition:

V-joints (angle 60°) with a heel were made by MIG welding with a gas made up of Ar+10% He+0.25% $CO_2$, and with a welding energy of 1 kJ/mm. All the welds have satisfactory appearance and the characteristics of the welds were:

| Wire | Compact-ness (ASME IX) | Average melt zone Pren | Tc scratch ° C. ASTM G 48 A | KCV - 196° C. (J/cm$^2$) | Rm (MPa) |
|---|---|---|---|---|---|
| A | Acceptable | 71.5 | 90 | 176 | 787 |
| C | Acceptable | 61.5 | 75 | 152 | 736 |

Wire A according to the invention leads to a weld having better corrosion resistance, better low-temperature resilience and higher mechanical strength than wire C according to the prior art.

We claim:

1. A nickel-based alloy, whose chemical composition consists of, by weight:

24.5%<Cr≦26.5%

13.5%≦Mo≦16.5% the remainder being nickel, optionally one or more complementary alloy elements selected from nitrogen, aluminium and magnesium, and impurities resulting from processing.

2. The nickel-based alloy as claimed in claim 1, wherein:

24.8%≦Cr≦25.2%

14.8%≦Mo≦15.2%.

3. The nickel-based alloy as claimed in claim 1, wherein:

0%≦N≦0.2%.

4. The nickel-based alloy as claimed in claim 3, wherein:

0.05%≦N≦0.2%.

5. The nickel-based alloy as claimed in claim 1, wherein:

0%≦Al≦0.4%

0%≦Mg≦0.04%.

6. The nickel-based alloy as claimed in claim 1, wherein:

Fe≦5%.

7. The nickel-based alloy as claimed in claim 6, wherein:

Fe≦2%.

8. The nickel-based alloy as claimed in claim 1, wherein:

C≦0.02%

Si≦0.1%

Mn≦0.4%

W≦0.3%

Cu≦2%

P≦0.02%

S≦0.02%.

9. A drawn wire or cold-rolled sheet, which consists of a nickel-based alloy as claimed in claim 1.

10. A welding electrode, which includes at least one wire as claimed in claim 9.

11. A process for welding a superduplex or superaustenitic stainless steel or a nickel-based alloy, wherein a filler metal is provided by a drawn wire or a cold sheet as claimed in claim 9.

* * * * *